Feb. 26, 1957

J. E. DAVIES ET AL 2,783,340

HERMETICALLY SEALED ELECTRO-MAGNETIC
CONTACTORS AND THE LIKE

Original Filed Jan. 11, 1954

Inventors.
James E. Davies.
Charles W. Otto
By H. R. Rather
Attorney

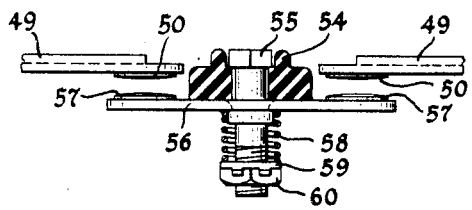
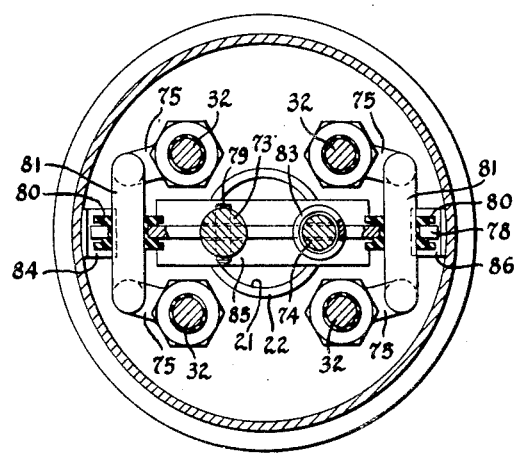
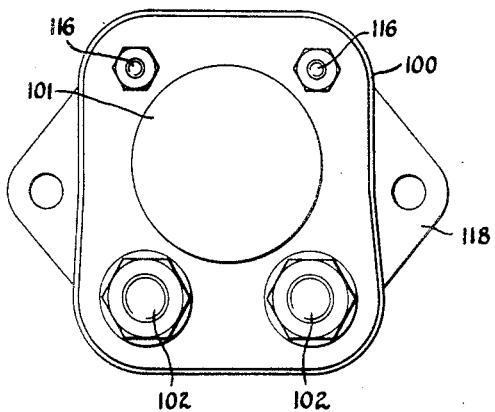

Feb. 26, 1957
J. E. DAVIES ET AL
2,783,340
HERMETICALLY SEALED ELECTRO-MAGNETIC
CONTACTORS AND THE LIKE
Original Filed Jan. 11, 1954
4 Sheets-Sheet 4
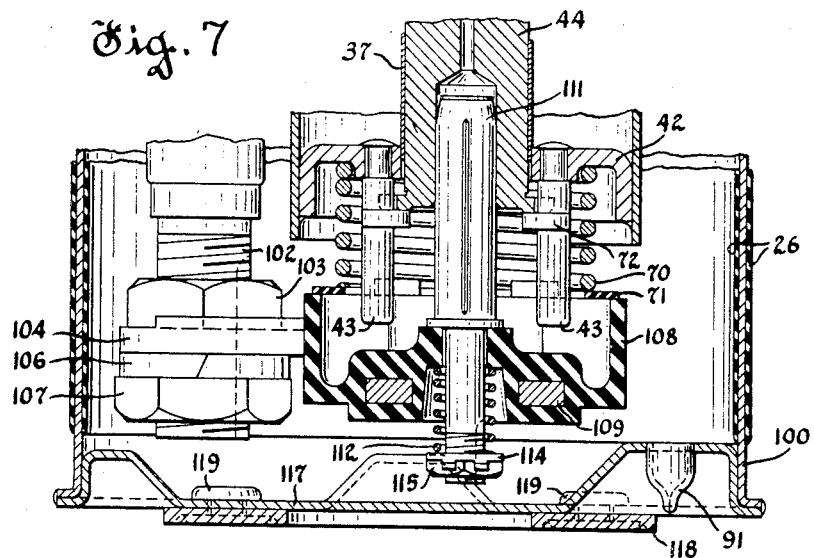
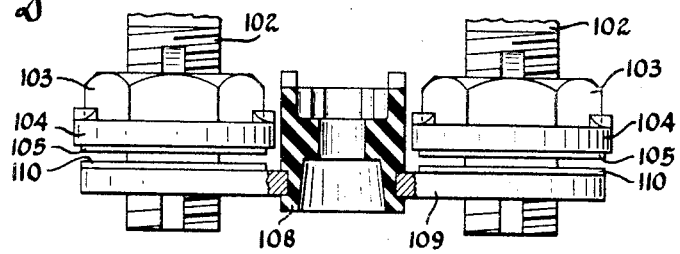
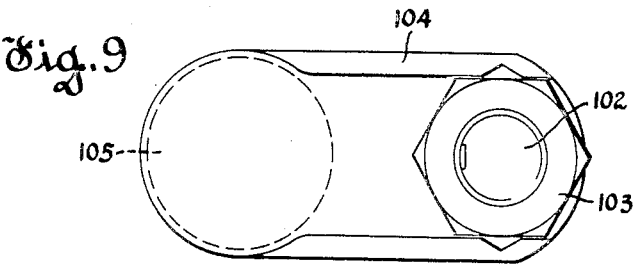
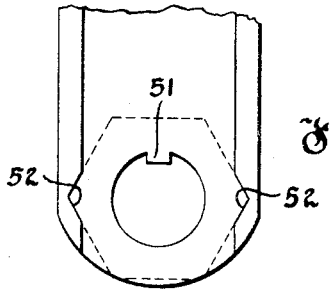
Inventors.
James E. Davies.
Charles W. Otto
By H R Rather
Attorney

United States Patent Office 2,783,340
Patented Feb. 26, 1957

2,783,340

HERMETICALLY SEALED ELECTRO-MAGNETIC CONTACTORS AND THE LIKE

James E. Davies, Milwaukee, Wis., and Charles W. Otto, De Kalb, Ill., assignors to Cutler-Hammer, Inc., Milwaukee, Wis., a corporation of Delaware Original application January 11, 1954, Serial No. 403,124. Divided and this application April 1, 1955, Serial No. 498,527

4 Claims. (Cl. 200—166)

This invention relates to hermetically sealed electromagnetic contactors and the like.

This application is a division of our application serial number 403,124, filed January 11, 1954.

Modern military aircraft because of their wide range of operational altitudes and ability to change altitude rapidly, set up severe ambient conditions for electromagnetic contactors and relays controlling electrical systems in the aircraft. Electrical leakage and arc-over at the low pressures of high altitudes, and entrainment and condensation of water vapor caused by rapid changes in pressure and temperature reach serious proportions. This has necessitated the development of hermetically sealed designs, and it is the primary object of the present invention to provide improved forms of hermetically sealed electromagnetic contactors capable of relatively high current carrying capacity.

Another object is to provide contactors of the aforementioned kind which are characterized by their ability to withstand severe mechanical shock and vibration, and operate at, and withstand wide ambient temperature extremes.

A further object is to provide contactors of such type which are also characterized by high resistance to electrical leakage and arc-over.

A still further object is to provide optional interlock, or auxiliary contact switch units for such contactors which are simple and rugged from the standpoint of mechanical shock and vibration resistance.

A more specific object is to provide improved stationary contact structures which eliminate weight and bulk while affording high current carrying capacity.

Another specific object is to provide improved means for effecting and retaining contact pressure adjustment, and A still further specific object is to provide an improved hermetically sealed combination mechanism supporting and enclosing casing for such contactors.

Other objects and advantages of the invention will hereinafter appear.

The accompanying drawings illustrate certain preferred embodiments of the invention which will now be described, it being understood that the embodiments illustrated are susceptible of various modifications in respect of details without departing from the scope of the appended claims.

In the drawings:

Fig. 4 is a view taken along the line 4—4 of Fig. 2.

Fig. 4a is a plan view of a keyed lock washer shown in Fig. 2.

Fig. 5 is a sectional view taken along the line 5—5 of Fig. 3.

Fig. 6 is a top plan view of a single pole contactor constructed in accordance with the invention.

Fig. 7 is a fragmentary view in vertical section of the contactor of Fig. 6.

Fig. 8 is a vertical side view of elements shown in Fig. 7, and

Figs. 9 and 10 show details of a form of stationary contact and contact assembly used in both forms of contactors.

Figure 2:
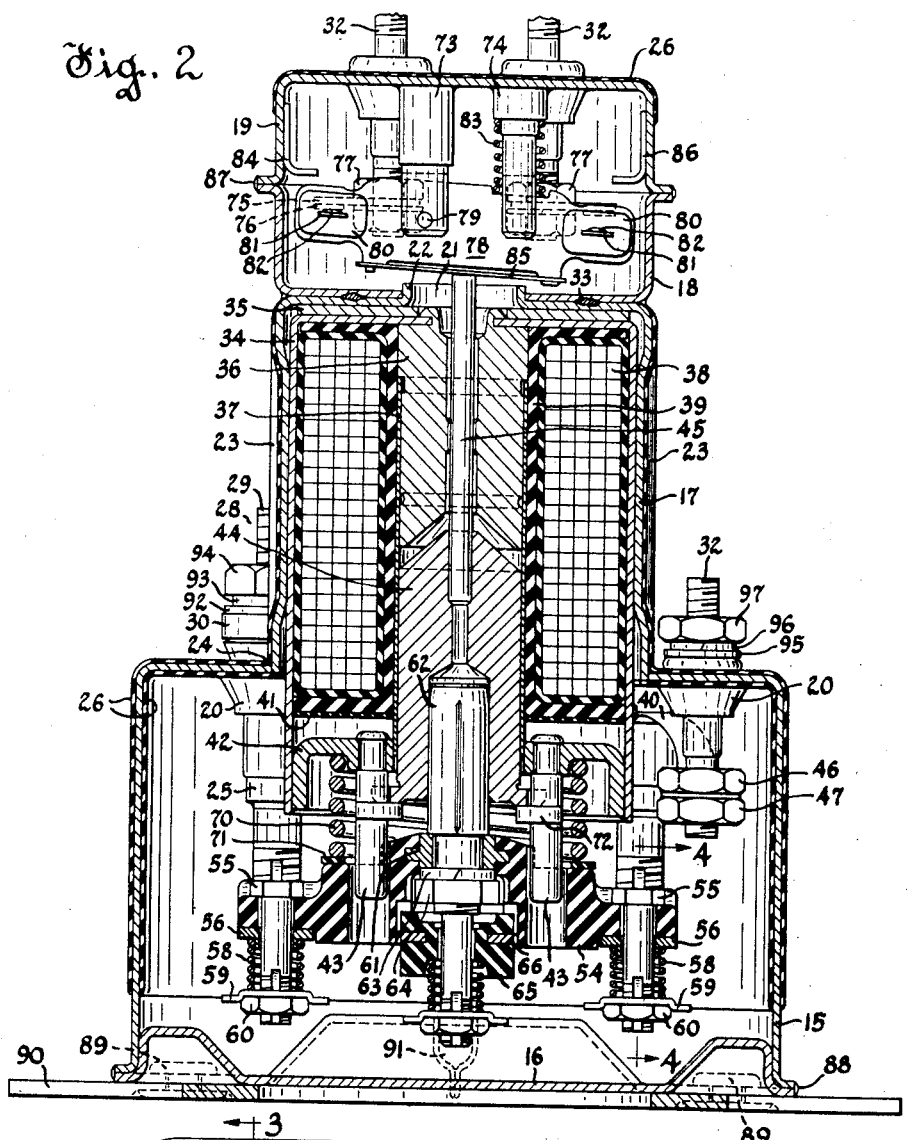
Fig. 2 is a view in vertical cross section taken along the line 2—2 of Fig. 1.
Figure 1:
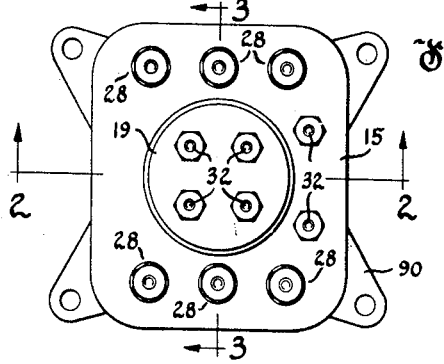
Figure 1 is a top plan view of a three pole contactor with auxiliary interlock switch constructed in accordance with the invention.

Referring to Figs. 1 to 5, they show a three pole, hermetically sealed electromagnetic contactor having an auxiliary interlock switch. It comprises as a housing a lower, substantially rectangular cup-shaped member 15 in which is housed the main contactor, a cover plate 16 for member 15, and intermediate cylindrical cup-shaped member 17, in which is housed a solenoid operating assembly, and upper shallow cylindrical cup-shaped members 18 and 19 in which is housed the interlock switch assembly. These housing members are preferably formed of a low magnetic metal, such as stainless steel.

Member 15 is preferably drawn from a metal blank with a central opening punched through its upper end and also having a plurality of smaller openings extruded through such end with inwardly projecting frusto-conical flanges 20. Member 17 is likewise drawn from a metal blank and provided with a central opening 21 through its upper end which is encircled by an upstanding flange portion 22. Two pairs of longitudinal indentations 23 are also formed on opposite sides of member 17 for a purpose that will be hereinafter explained.

As a first step in assembly of the contactor, the lower end of member 17 is inserted into the central opening of member 15 and the two members are then joined by a continuous peripheral weld 24. Next, bushings 25 are fitted into all but two of the aforementioned extruded openings in member 15 and complemental frusto-conical portions thereof are bonded and fused to the flanges 20 by a fused and solidified vitreous material 26, which is simultaneously fused on the outer side wall of member 17 and the greater portions of the inner and outer surfaces of member 15. The Higgins Patent 2,405,425 describes a preferred method and means for achieving such bonding and fusing with vitreous material.

It has been found that the strength of the bond between the flanges 20 and the bushing 25 is enhanced if the thickness of the fused vitreous material therebetween is made as thin as is permitted by dielectric strength requirements. Thicknesses on the order of 10 to 25 thousandths of an inch maximum for such material have been found to provide joints of relatively high strength.

Figure 3:
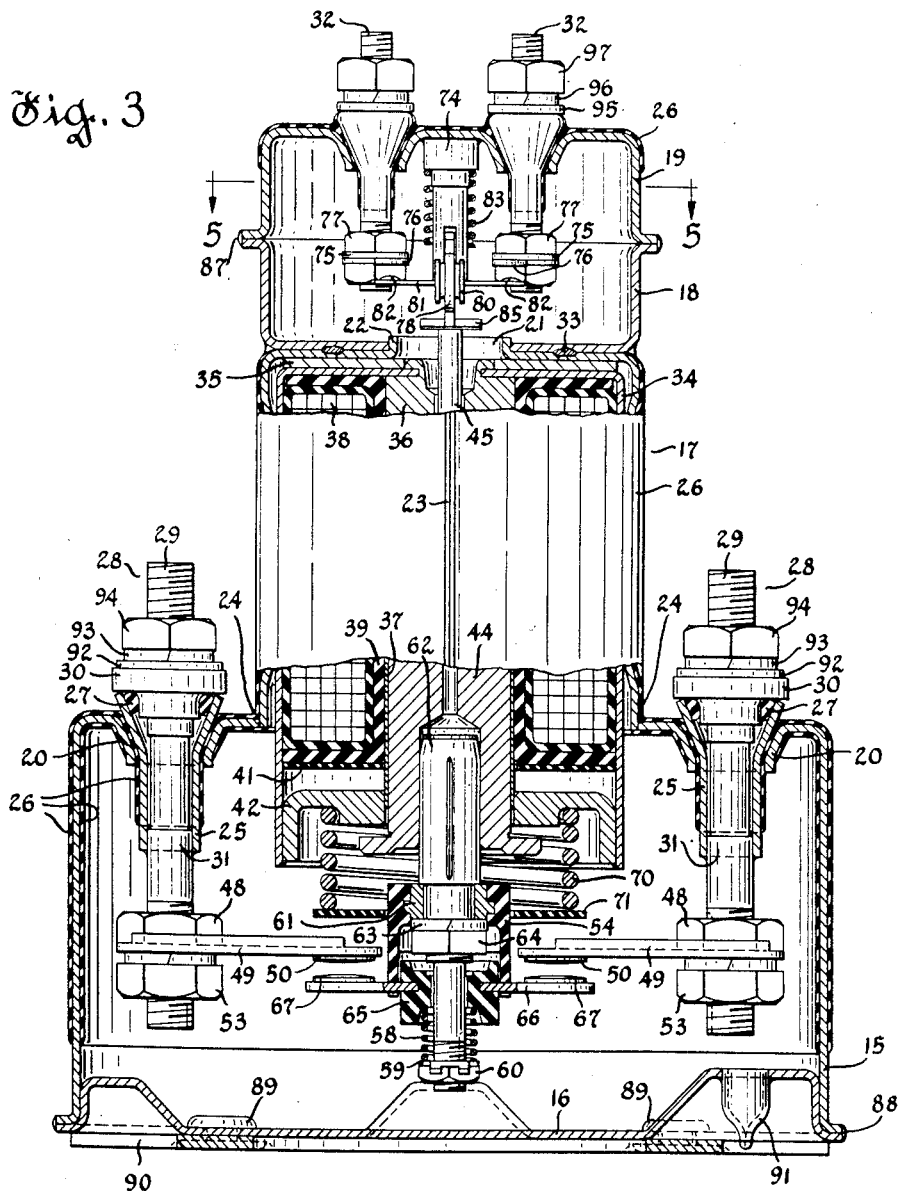
Fig. 3 is a view like Fig. 2 but taken along the line 3—3 of Fig. 1.

Silicon rubber seal rings 27 are placed inside each of the frusto-conical portions of the bushings 25, and then contact terminals generally designated 28 and each comprising stud 29 formed of a copper alloy and a copper collar 30 brazed to stud 29, are inserted through the bushings 25 so that the lower surface of the collar 30 seats against the upper edge of a bushing 25. Each stud is then silver brazed to the lower cylindrical portion of its associated bushing in an area designated 31 to provide a hermetic tight joint therebetween. As best shown in Fig. 3, the studs 29 have considerable radical clearance with respect to the inner surface of the cylindrical portion of the bushings 25, where not brazed thereto, to accommodate the greater thermal expansion of such studs. In the other two flanges, coil terminal studs 32, preferably formed of stainless steel and having complementally formed frusto-conical portion adapted to seat against the corresponding portions of the flanges 20 are fused and bonded in place with vitreous material, such preferably being done at the time that the aforementioned bushings 25 are fused and bonded in place.

The lower cup-shaped interlock housing member 18, has a central opening therein to accommodate the flange portion 22 of member 17, against which it seats, and the engaging surfaces of the two members are then joined by a continuous projection ring weld designated 33.

Within member 17 there is carried a cup-shaped shell 34, preferably drawn from a mild steel blank, and in which is mounted the solenoid assembly. Shell 34 has a clearance opening at its upper end and a magnetic steel washer 35 is welded to the outer end of said shell about said opening. A substantially cylindrical core 36 formed of magnetic steel has a reduced end portion which projects through the aforementioned opening in shell 34 and which is upset over the end of the latter to secure it in place. Core 36 is provided with a conical recess in its lower end and an axial clearance opening extends from the bottom of said recess through the upper end of the core. A brass cylindrical guide sleeve 37 is secured to the outer surface of core 36 and extends axially of shell 34. With the aforementioned parts assembled in and to shell 34, a liquid resinous impregnating material is placed inside the shell, and an electromagnetic coil 38 and insulating support spool 39 are then inserted into the shell about the sleeve 37. Coil leads 40 are brought out through slots in the side of shell 34 adjacent its lower end. An insulating washer 41 is then placed over the lower end of spool 39 and the partially completed solenoid assembly is then subjected to a heat treatment to distribute the impregnating material within the voids inside shell 34, and after cooling the impregnating material solidifies, with the coil and spool subassembly being firmly anchored within the shell 34. A cup-shaped washer 42 having an outer-upstanding flange and short inner upstanding flange surrounding a central opening therein, and having a pair of pins 43 riveted to the inner flange of washer 42 within clearance openings in the latter, is inserted into the lower end of shell 34. A plunger 44, made of the same metal as core 36, and an interlock operating rod 45 press fitted into an upper recess in plunger 44 is then inserted into the sleeve 37 and rod 45 threaded into the axial opening of core 36. Plunger 44 is then pressed inwardly so that its lower end peripheral flange engages the inner flange of washer 42, and is continued to be moved inwardly until its complementally formed conical upper end seats against the surface of the aforementioned conical recess in core 36. Then the plunger seats against the core, the washer 42 will be driven into shell 34 the proper distance automatically, and the washer is then fixed in place in shell 34 by high frequency soldering. If some air-gap is desired between the flange of plunger 44 and the inner flange of washer 42 when the plunger seats at its upper end against core 36, a temporary washer of a thickness corresponding to the desired air-gap should be placed over the plunger flange when washer 42 is driven into position. The completed solenoid assembly is press fitted into the member 17 so that the washer 35 tightly engages the upper inner surface of member 17 and the outer wall of shell 34 tightly engages with the inner side wall of member 17, the aforementioned indentations 23 in the latter serving to lock the shell against movement in member 17.

Inner nuts 46 are placed on the threaded portions of the two coil terminal studs 32 within member 15, and lug ends of the leads 40 are placed over their respective studs and outer self-locking nuts 47 taken down thereon to secure the coil leads to the terminal studs. As best shown in Fig. 3 inner nuts 48 are then placed on each of threaded portions of the contact terminals 29 lying within member 15. A stationary contact comprising a support 49 and contact tip 50 welded to the support adjacent one end thereof is positioned on each of the terminal studs 29 with an inwardly projecting lug 51 (see Fig. 10) in the clearance opening in support 49 being centered in a corresponding keyway in stud 29. Upwardly extending side flanges of the supports 49 are notched at 52, as shown in Fig. 10, and when the web of a support is brought up against a nut 48, it prevents the turning of the latter. It will be seen that nut 48 can have any one of twelve equally spaced rotary angle positions corresponding to one-half the angle between hexagonal corners on a nut 48. A lock washer and outer nut 53 are taken down on each stud 29 to secure the stationary contacts in place.

A movable carrier 54, formed of a molded high temperature insulating material has mounted on opposite sides thereof outboard contactor assemblies, each of which comprises a key-slotted, hexagonal headed guide pin 55, a contactor 56 with contact tips 57 welded adjacent each end, a contact pressure spring 58, a keyed end washer 59 (see Fig. 4ᵃ) and a nut 60. Each contactor 56 seats about its guide pin in a rectangular corner recess formed in carrier 54 to restrain the contactor against lateral displacement.

In its central portion carrier 54 is provided with an opening extending therethrough which is stepped in diameter, and adjacent the upper end of such opening has a metal bushing 61 molded therein. Carrier 54 is mounted on a pin 62 and is secured thereon by a lock washer 63 and a nut 64 taking down on a threaded portion of the pin. A center carrier 65, molded of the same material as carrier 54, has a contactor 66 molded therein, which contactor has contact tips 67. Contactor 66 seats within a transverse rectangular recess (see Fig. 3) formed within carrier 54 and is biased into seating position by a pressure spring 58 disposed about a reduced threaded end portion of pin 62 and bearing against a keyed retaining washer 59 held in place by a nut 60.

In the assembling of the contactor, the aforementioned carrier 54 and outboard contactor assemblies are mounted on pin 62, and an enlarged serrated portion of the pin is then inserted into a lower end recess formed in plunger 44, and then with a helical coil return spring 70 and a glass fiber washer 71 interposed between washer 42 and the upper surface of carrier 54 and with the guide pins 43 projecting through clearance openings formed in carrier 54 and plunger 44 seated against core 36, pin 62 is driven into plunger 44 with a force fit until the movable contactor contact tips just engage with the stationary contact tips. Pin 62 is thereafter driven farther into plunger 44 by an amount equal to the desired contact "wear-allowance." Guide pins 43 are then rotated so that laterally projecting lugs 72 formed thereon overlie plunger 44 and limit movement of the latter outwardly of sleeve 37. The center contact carrier 65 with contactor 66 are then mounted and secured on pin 62, as hereinbefore described. The pressure of contact engagement can be readily adjusted by inserting a suitable socket wrench over the nuts 60, pressing the washer 59 away from the nuts 60 and adjusting the position of the latter on the pins 55 to provide the desired tension in the springs 58. The washers 59, as will be observed, are so designed as to permit a matching size of hexagonal nut to be restrained against rotation in any one of twelve equally spaced rotary positions when the washer engages against the adjacent surface of a nut, but permit free rotary adjustment of the nut when disengaged and spaced sufficiently apart therefrom.

The interlock switch assembly is mounted to and supported wholly from the inside of member 19. Member 19, like member 15, has openings extruded through its upper end with inwardly projecting frusto-conical flanges 20 formed about such openings. Terminal studs 32, like those for the solenoid coil leads, have their complemental frusto-conical portions fused and bonded to the flanges 20 by solidified vitreous material 26 which also covers the outer end surface of member 19 and a portion of the side wall thereof. A slotted pivot post 73, and a slotted spring guide post 74 are butt welded to the inside of the upper end of member 19, prior to the bonding of the studs 32 in place therein. Stationary contacts 75 having contact tips 76 are secured to each of the studs 32 between inner and outer nuts 77. A flat, stamped metal carrier 78 is pivotally mounted within the slot in post 73 on a pivot pin 79 which is mounted in alined transverse openings extending through the post. At each end of carrier 78 is provided with C-shaped openings in which are clamp-secured insulating bushings 80, having transversely extending contactors 81 molded therein which have contact tips 82. A coil spring 83 disposed about post 74 and abutting at its upper end against a shoulder on such post, engages carrier 78 within a notch formed in the upper edge of the latter and biases it for movement in the clockwise direction, as viewed in Fig. 2. Movement in the clockwise direction is limited by an L-shaped member 84 welded to the inside wall of member 19.

Operating rod 45 at its upper end engages with a flat strip spring 85 which is mounted on downwardly depending lugs formed on the lower edge of carrier 78. At one end spring 85 is firmly secured on a lug, but at its other end is permitted, by means of an elongated opening, limited longitudinal movement on the other lug to permit limited concave flexure. When rod 45 is moved upwardly, spring 85 and carrier 78 are moved pivotally in the counterclockwise direction as viewed in Fig. 2 about pin 79 to effect disengagement of the normally closed contacts and engagement of the normally open contacts against the bias exerted by spring 83. Following engagement of the normally open contacts carrier 78 engages an L-shaped member 86 welded to the inside of member 19, and any following additional upward movement, or "over-travel," of rod 45 is taken up by concave flexure of spring 85.

Following mounting of all the aforedescribed interlock switch elements in member 19, the latter is seated on its outwardly extending lower flange against a corresponding flange of member 18, and the edges of such flanges are continuously welded together about their circumference in the area designated 87.

After the solenoid, main contact and interlock contact assemblies are installed in the housing members, the edge flange of cover plate 16 is seated against the bottom flange of member 15 and the edges of said flanges are continuously welded about their circumference along the area designated 88. Prior to such fastening of plate 16, the same is provided with flat headed welding studs 89 welded to the inner surface of the plate and having short shanks extending downwardly. Following the welding of plate 16 to member 15, a flat metal mounting bracket 90 is placed over the bottom side of plate 16, with the studs 89 extending through clearance openings in the bracket, and said studs are "weld-riveted" over against the bottom side of the bracket to rigidly secure the latter to the contactor housing.

After mounting of bracket 90, the interior of the housing is evacuated through the tube 91, and a mixture of gases is introduced therein. Tube 91 is then clinched and sealed-off adjacent its end welding.

As a final step in the assembly a small washer 92, lock washer 93 and nut 94 are placed on each contact terminal 29 to facilitate attachment of electrical conductors thereto. Similarly a small washer 95, lock washer 96 and nut 97 are placed on each of the coil and interlock terminal studs 32 for the same purpose.

If desired, the interlock switch assembly with its housing members 18 and 19 may be omitted, in which case the upper end of member 17 would be completely closed and have adhering thereto vitreous material 26, and rod 45 would be appropriately shortened to permit sealing of plunger 44 against core 36 without the rod engaging the end of member 17. A two pole contactor, with or without the interlock switch assembly, can be had by merely omitting the center carrier 65 and contactor assembly carried thereby as well as the stationary contact terminal assemblies 28 associated with such contactor assembly. Such a two pole contactor would be capable of a somewhat higher current carrying capacity than the aforedescribed three-pole contactor.

Figs. 6 through 8 show a single pole contactor which for the most part is constructed as aforedescribed in connection with the three-pole contactor of Figs. 1 through 5, but having considerably higher current carrying capacity. More particularly it comprises a lower cup-shaped housing member 100 and an upper cylindrical cup-shaped member 101. The solenoid operating assembly contained in member 101 is like that shown and described in connection with Figs. 2 and 3. Within member 100 there are mounted stationary contact terminal studs 102, which may be assumed to be parts of terminal assemblies like that shown and described in connection with Figs. 2 and 3, although being somewhat greater in cross sectional area to handle higher current. Each stud has an inner nut 103, a stationary contact 104 with a contact tip 105 welded thereon, a lock washer 106 and outer nut 107. A carrier 108, formed of a high temperature molded insulating material and having a contactor 109, with contact tips 110 molded, therein is mounted on the reduced portion of a pin 111 against a shoulder thereon. The pin 111 is force fitted in the plunger 44 in the manner hereinbefore described, and carrier 108 is yieldingly mounted on said pin against a shoulder thereon by means of a coil spring 112 disposed about a portion of the pin and seating at its upper end in a recess formed in the carrier. At its lower end spring 112 seats against a washer 114, like washer 59, and said washer is retained on the pin by a nut 115. Coil terminal studs 116 constitute parts of coil terminal assemblies like those shown and described in connection with Figs. 2 and 3. A cover plate 117 is welded to the out-turned bottom flange of member 100, and said plate has secured thereto a flat mounting bracket 118 secured by weld-riveted studs 119.

We claim:

1. In combination, a terminal stud having a threaded portion formed adjacent one end thereof with a longitudinal keyway, and a stationary contact assembly mounted on said stud comprising a member having a flat web portion and relatively short perpendicular flanges merging with said web portions on opposite sides of the latter, a contact tip secured to said web portion adjacent one end of the latter, said web portion having an opening formed therein adjacent its other end through which said stud extends and having a lug projecting into said key-way, said flanges having V-shaped notches in their opposed surfaces with their apexes along a line passing through the center of the opening in said web portion, a polygonal nut on said stud with the flanges of said member overlapping its sides, said nut being so sized with respect to the spacing between said flanges and the apexes of said notches that said nut is locked against rotation on said stud whether opposite sides thereof are parallel with said flanges or opposite corners engage with said flanges in said notches, and a second nut on said stud holding said member in place against the first mentioned nut.

2. A stationary contact assembly comprising a member having a flat web portion and relatively short perpendicular flanges merging with said web portion on opposite sides of the latter, and a contact tip secured to said web portion adjacent one end of the latter, said web portion having an opening formed therein adjacent its other end and having a key-lug projecting towards the center of such opening, and said flanges having V-shaped notches in their opposed surfaces with the apexes of the same in a line passing through the center of said opening.

3. In combination, an insulating carrier member, a movable contactor assembly comprising a pin projecting through an opening in said member and having a head seating against one side of the latter and a threaded shank with a longitudinal key-way formed therein, a contactor with contact tips secured adjacent its opposite ends and a central opening through which said pin extends seated against the other side of said member, a coil compression spring disposed about said pin and seated at one end against said contactor, a washer comprising a key-lug apertured central portion through which said pin extends seated on one surface against the other end of said spring, and corresponding longitudinal bifurcated end portions which merge with but are off-set from the plane of said central portion on opposite sides of the latter, and a polygonal nut on said pin and seated against the other surface of the central portion of said washer with the end portions of the latter over-lapping its sides, said nut being so sized with respect to the longitudinal dimension of the central portion of said washer that it is locked against rotation on said pin whether opposite sides of said nut are perpendicular to such washer dimension or opposite corners project into the notches of the end portions of said washers.

4. A preformed washer for bearing against and holding a nut in any one of equally spaced rotary positions on a threaded stud or the like having a longitudinal key-way formed thereon comprising a flat central portion having an opening formed therein with an inwardly projecting key-lug and bifurcated end portions merging with and off-set in a plane substantially parallel with the plane of said central portion on opposite sides of the latter.

References Cited in the file of this patent
UNITED STATES PATENTS

| | | |
|---|---|---|
| 1,077,080 | Jones | Oct. 28, 1913 |
| 1,115,924 | Gable | Nov. 3, 1914 |
| 2,394,666 | Cloedy et al. | Feb. 12, 1946 |